United States Patent
Jia et al.

(10) Patent No.: US 11,589,313 B2
(45) Date of Patent: Feb. 21, 2023

(54) DYNAMIC CONNECTED DISCONTINUOUS RECEPTION PROFILE BASED ON QUALITY OF SERVICE

(71) Applicant: AT&T Intellectual Property I, L.P., Atlanta, GA (US)

(72) Inventors: Yupeng Jia, Austin, TX (US); Yizhe Zhang, Austin, TX (US); John Bulger, Austin, TX (US); Scott Prather, Seattle, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 39 days.

(21) Appl. No.: 17/164,453

(22) Filed: Feb. 1, 2021

(65) Prior Publication Data
US 2022/0248331 A1   Aug. 4, 2022

(51) Int. Cl.
  *H04W 52/02*  (2009.01)
  *H04W 28/02*  (2009.01)
  *H04W 76/28*  (2018.01)

(52) U.S. Cl.
  CPC ... *H04W 52/0258* (2013.01); *H04W 28/0268* (2013.01); *H04W 76/28* (2018.02)

(58) Field of Classification Search
  None
  See application file for complete search history.

(56) References Cited

U.S. PATENT DOCUMENTS

| | | | | |
|---|---|---|---|---|
| 2004/0001510 | A1* | 1/2004 | Hamilton | H04L 47/50 370/466 |
| 2012/0023504 | A1* | 1/2012 | Noam | H04N 19/156 718/105 |
| 2013/0308507 | A1* | 11/2013 | Wanstedt | H04W 52/0216 370/311 |
| 2017/0215101 | A1* | 7/2017 | Bertz | H04W 28/0268 |
| 2017/0295608 | A1* | 10/2017 | Li | H04W 52/02 |
| 2019/0052413 | A1* | 2/2019 | Babaei | H04L 43/0864 |
| 2019/0124545 | A1* | 4/2019 | Gandhi | H04W 36/30 |
| 2020/0059988 | A1* | 2/2020 | Tabet | H04W 76/28 |
| 2020/0205081 | A1* | 6/2020 | Garg | H04W 52/0216 |
| 2020/0296627 | A1* | 9/2020 | Arvidson | H04W 28/0819 |
| 2021/0045182 | A1* | 2/2021 | Raghunathan | H04W 76/27 |

FOREIGN PATENT DOCUMENTS

| | | | |
|---|---|---|---|
| CN | 109462839 | * | 3/2019 |
| KR | 20110111451 | * | 10/2011 |

OTHER PUBLICATIONS

3GPP TS 38.331 V16.3.1. Radio Resource Control (RRC) protocol specification (Release 16) (Year: 2001).*
Ericsson. Machine Learning for Adaptive DRX (Year: 2012).*

* cited by examiner

*Primary Examiner* — Andre Tacdiran
(74) *Attorney, Agent, or Firm* — Guntin & Gust, PLC; Kenneth Kwan

(57) ABSTRACT

A method includes determining a quality of service class identifier (QCI) level for an application running on a user device, selecting a connected mode discontinuous reception (CDRX) profile based on the QCI level, and transmitting the CDRX profile to the user device to be used when running the application. The QCI level may be indicative of delay sensitivity of the application and the CDRX profile may be selected based on the delay sensitivity of the application.

20 Claims, 4 Drawing Sheets

DYNAMIC CONNECTED DISCONTINUOUS RECEPTION PROFILE BASED ON QUALITY OF SERVICE

TECHNICAL FIELD

This disclosure is directed to systems and methods for extending battery life in a network device, and more particularly, to dynamically adjusting the connected discontinuous reception (CDRX) profile based on the quality of service (QoS) parameters.

BACKGROUND

Discontinuous Reception (DRX) is designed to save battery life for user equipment (UE). If DRX is not enabled, the UE must be awake and ready to receive and decode downlink data because of the uncertainty associated with the timing of the reception of such downlink data. This means that the UE has to be monitoring the physical downlink control channel (PDCCH) in every subframe in order to check if there is downlink data available. This consumes the UE's power. DRX in LTE improves UE battery lifetime. In DRX, UE discontinuously receives PDCCH.

Connected Mode Discontinuous Reception (CDRX) is a feature introduced in Release 8 of 3GPP. The CDRX mechanism allows the UE to make signaling-free transitions between sleep and awake states.

Currently there is a single static CDRX profile in 5G New Radio (NR) network configurations. As such, power consumption cannot be with such a single static CDRX configuration Moreover, if the static CDRX profile is too long, that may cause significant delays is certain configurations and for certain applications, which may, for example, include Voice over LTE (VoLTE) calls. If the CR will cause longer delay in some specific configuration such as VoLTE call Conversely, if the static CDRX profile is too short, power consumption will be greater, and any power efficiencies will not be realized.

Accordingly, there is a need for a system and method that will optimize power consumption of a UE.

SUMMARY

The present disclosure is directed to a method including determining a quality of service class identifier (QCI) level for an application running on a user device, selecting a connected mode discontinuous reception (CDRX) profile based on the QCI level, and transmitting the CDRX profile to the user device to be used when running the application. The QCI level may be indicative of delay sensitivity of the application and wherein the CDRX profile may be selected based on the delay sensitivity of the application. The CDRX profile may have an off-cycle time that may be longer for non-delay sensitive applications than the off cycle time for delay sensitive applications. The CDRX profile includes an on period and an inactive period, wherein the inactive period of the CDRX profile may be longer for the application if the application is not delay sensitive than it may be if the application is delay sensitive. In an aspect, the CDRX profile may be based on the application without regard to the QCI level. The CDRX profile may be selected based on a historical association between QCI level and CDRX profiles, wherein in an aspect, the selection of the CDRX profile associated with a QCI level may be modified based on the historical association. In an aspect, the performance of an application running on the user equipment may be measured in view of the CDRX profile and QCI level associated with the CDRX profile and the CDRX profile associated with the QCI level may be selected based on historical performance data. In an aspect, the CDRX profile may be static and a discontinuous reception (DRX) timer may be adjusted based on the QCI level.

The present disclosure is also directed to an apparatus including an input-output interface, a processor coupled to the input-output interface wherein the processor may be further coupled to a memory, the memory may have stored thereon executable instructions that when executed by the processor cause the processor to effectuate operations including receiving an identification of an application on a device, selecting a continuous mode discontinuous reception (CDRX) profile based on the application, and transmitting the CDRX profile to the device for use when using the application. The operations further include associating a quality of service class identifier (QCI) with the application and wherein the CDRX profile may be selected based on the QCI. In an aspect, the operations may further include measuring the performance of the application and optimizing the performance based on an historical association of the CDRX profile and the QCI. The QCI may be indicative of delay sensitivity of the application and wherein the CDRX profile may be selected based on the delay sensitivity of the application. The CDRX profile may have an off cycle that may be longer for non-delay sensitive applications than it may be for delay sensitive applications. In an aspect, the application on the user equipment may change to a second application and the CDRX profile may be dynamically adjusted based on the second application. The CDRX profile includes an on period and an inactive period, wherein an inactive period of the CDRX profile may be longer for the application if the application may be not delay sensitive than the CDRX profile may be if the application may be delay sensitive.

The present disclosure is also directed to a system including user equipment configured to run an application, wherein the user equipment may be further configured to receive a continuous mode discontinuous reception (CDRX) profile, and a server configured to generate the CDRX profile for the user equipment, wherein the CDRX profile may be generated based on the quality of service class identifier (QCI) level associated with the application. The server may have a machine learning engine in communication with an historical database wherein the CDRX profile may be generated based on a machine learning algorithm. The user equipment may be further configured to run a second application which has a second QCI level, wherein the server may be further configured to dynamically update the CDRX profile of the user equipment based on the second QCI level.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION OF ILLUSTRATIVE EMBODIMENTS

System Overview. This disclosure is directed to a novel system and method for extending battery life by using the Quality of Service ("QoS") Class Identifier ("QCI") of service. QCI is a special identifier defining the quality of packet communications provided by LTE and 5G NR devices. The disclosure provides a system and method to dynamically switch between long and short DRX cycles and thereby reduce battery consumption and optimize power consumption. Moreover, dynamically adjusting the DRX cycles may also reduce latency for sensitive applications. Additionally, a machine learning component that comprises a predictive method for future CDRX optimized values is disclosed. In view of the foregoing, the present disclosure provides a practical application that advances the state of the telecommunications technology.

The disclosure utilizes the QCI to dynamically switch between long and short DRX cycles, or dynamically adjust DRX timers within the static DRX profile range. Such CDRX values may be defined in 3GPP TS 38.331.

The dynamic modification of DRX for UEs in RRC_CONNECTED mode (C-DRX) is described herein. The efficient use of UE battery power depends at least in part on the value of the parameters setting for DRX configuration, as well as the type of traffic being supported. As is known by those skilled in the art, the range of the QCI values has traditionally been between "1" and "9", with "1" being the most delay sensitive. Additionally, there are QCIs outside of that range for special purpose services. For example, delay-sensitive applications such as a VoLTE call may use QCI 1. Delay robust data connections such as IMS may use QCI5 while data bearers may use QCI8. While in data throughput applications such as QCI8, the network can adjust to a long DRX profile or longer DRX timers in the DRX profile to reduce UE power consumption.

The QCI may be initially set to a default value for a UE, such as default bearer (QCI9) when a subscriber is provisioned based on the type of plan associated with the subscriber. When the subscriber is using the UE, the application being used may dictate the appropriate QCI for that application, which may, for example, include conversational voice in VoLTE (QCI1), live streaming video (QCI2), real time gaming (QCI3), IMS signaling (QCI5), and email or other TCP-IP based functions (QCI8 or QCI9). It will be understood by those skilled in the art and based on 3GPP standards the appropriate QCI setting for each individual application.

Figure 1:
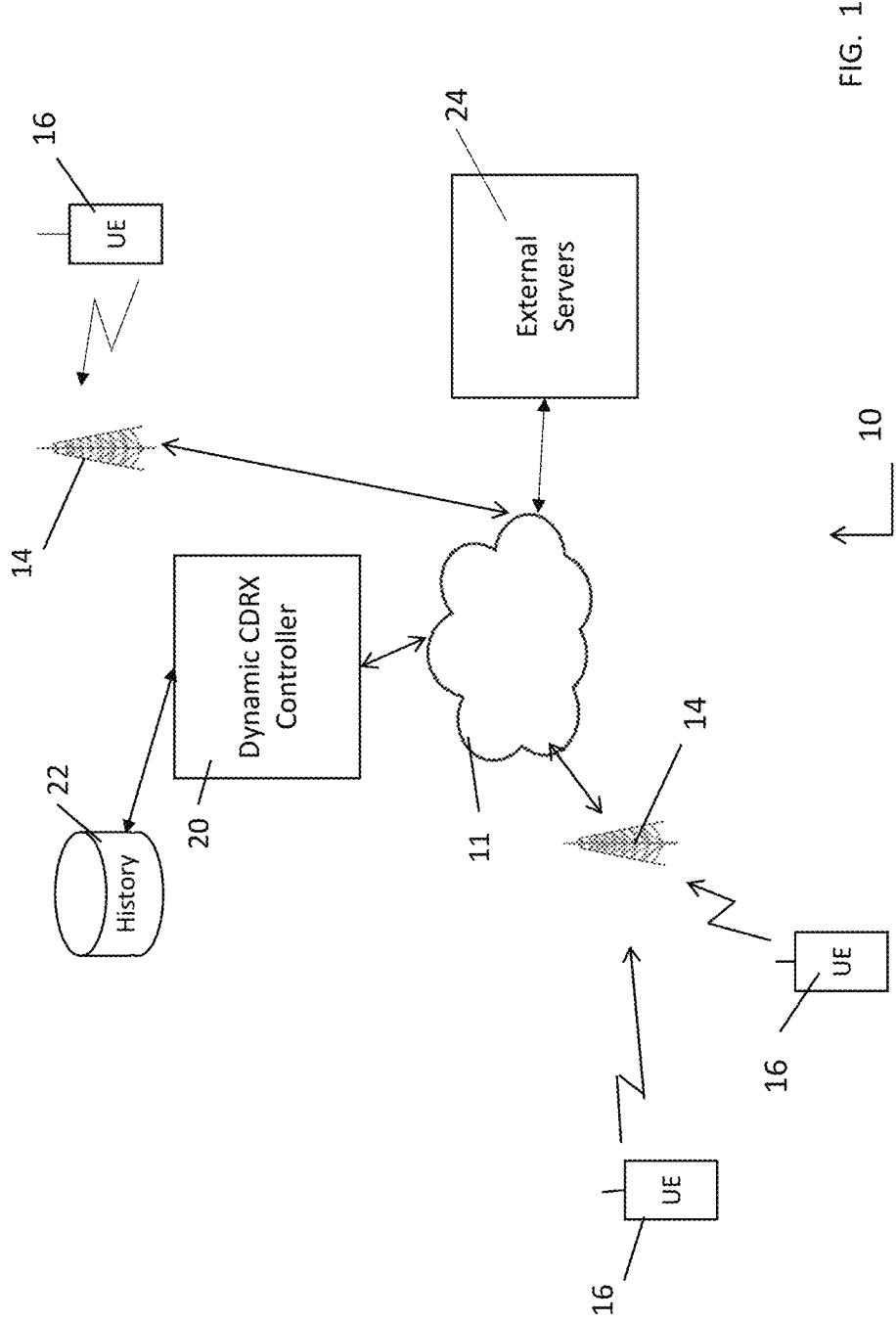
FIG. 1 illustrates an exemplary operating environment of the present disclosure.

Operating Environment. With reference to FIG. 1, there is shown a system 10 in which the present disclosure may be implemented. The system 10 may include to a network 11 which may, for example, be an Internet Protocol/Multiprotocol Label Switching (IP/MPLS) converged network. The disclosure is applicable to any type of network 11, which may, for example, be an LTE or a 5G network or any future network in which the dynamic CDRX controller 20 is deployed. It will be understood by those skilled in the art that while the network 11 may comprise the afore-mentioned networks, a combination of one or more communication networks may be used.

Input devices represented by mobile user equipment 16 such as a smart phone, tablet, PDA or other portable user device in communication via a cellular or other wireless system, represented by cell tower 14, may also be used. Each of the input devices 16 is in communication with a dynamic CDRX controller 20 having a historical database 22 associated therewith through network 11.

The UE 16 may, for example, be a smartphone, tablet or personal computer configured with an operating system or computer operating system or versions thereof. The UE 16 may control user input functions, including, but not limited to, selection and control of inputs to system 10 and receipt of outputs from system 10. The UE 16 may provide the ability for a user to input billing information, profile information, emergency contacts, or other inputs that enable or personalize the functions available to a user. The UE 16 may include local client software for communication with external servers 24 describer in more detail below.

The UE 16 may have one or more applications residing thereon and be able to access other services within network 11 or from external servers 24. For example, network-based services may include VoLTE voice calls, SMS or MMS messaging, or other network-based services. Client applications on the UE 16 may access corresponding server applications residing on external servers 24 such as social media applications, live video or video-on-demand services, music services, gaming services and other services. The application functionality embedded and described in the disclosure may reside either on the UE 16, within the network 11, or external servers 24 or a combination thereof. Any such designation of functionality between the UE 16 and external servers 24 may be a design choice or based on user experience, performance, cost, or any other factor. The allocation of functionality is exemplary only and non-limiting in scope of the present disclosure To communicate with the network 11, the UE 16 may have a direct or indirect communication interface for a wireless or wired communication system, which may, for example, be Wi-Fi, Bluetooth®, 3G, 46 LTE, and 5G, Wi-Fi, LAN, WiLan or any other wireless communication system. For the purposes of this disclosure, communication between the UE 16 and network 11 would be through cellular towers 14, With reference to FIG. 2, there is shown a more detailed view of the dynamic CDRX controller 20. The dynamic CDRX controller 20 may have a QCI-CDRX correlation module 17 which correlates QCI input data 2 to a dynamic CDRX profile. The dynamic CDRX controller 20 may also have an artificial intelligence/machine learning (AI/ML) engine 15. Unless otherwise specified, the terms "artificial intelligence" and "machine learning" will be used interchangeably herein and be represented by the acronym AI/ML. The AI/ML engine 15 will be described in more detail below in relation to the historical database 22.

The dynamic CDRX controller 20 may also have a processor 18 configured to execute instructions stored in memory 19.

Figure 2:
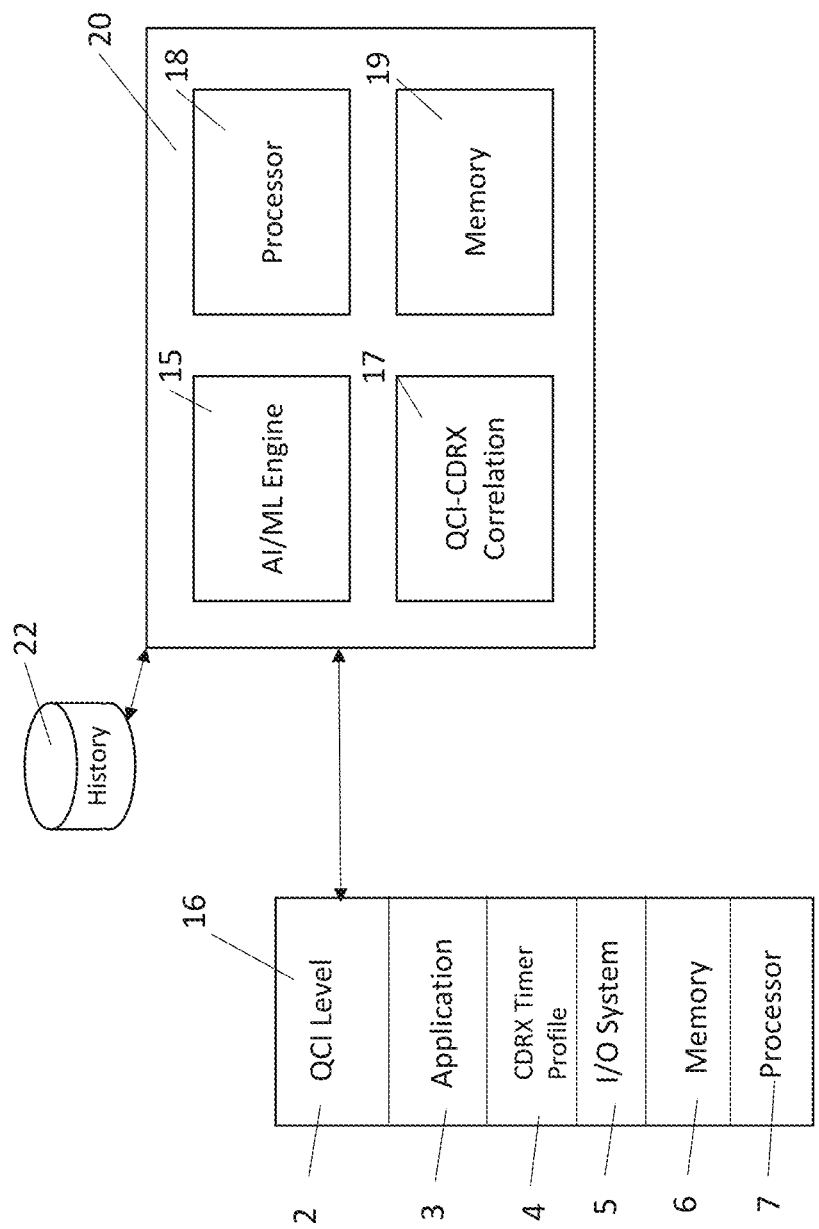
FIG. 2 illustrates a more detailed architecture of the present disclosure shown in FIG. 1.

The dynamic CDRX controller 20 may interface with UE 16 through network 11 and an eNodeB for 4G-LTE networks or a gNodeB for 5G networks each represented generically by cellular tower 17 in FIG. 1. A further breakdown of a portion of the functionality in the UE 16 is shown in FIG. 2. One or more applications 3 may be invoked to run on UE 16, each of those applications having an associated QCI level 2.

The UE 16 also includes a CDRX timer profile 4. In operation, the QCI level 2 may be passed to the dynamic CDRX controller 20 whereby the QCI-CDRX correlation function 17 is used to correlate the QCI level to a particular CDRX timer profile 4 and sent back to the UE 16 during execution of the selected application 3. The input/output system 5, memory 6 and processor 7 of the UE 16 is described in more detail below.

Figure 3:
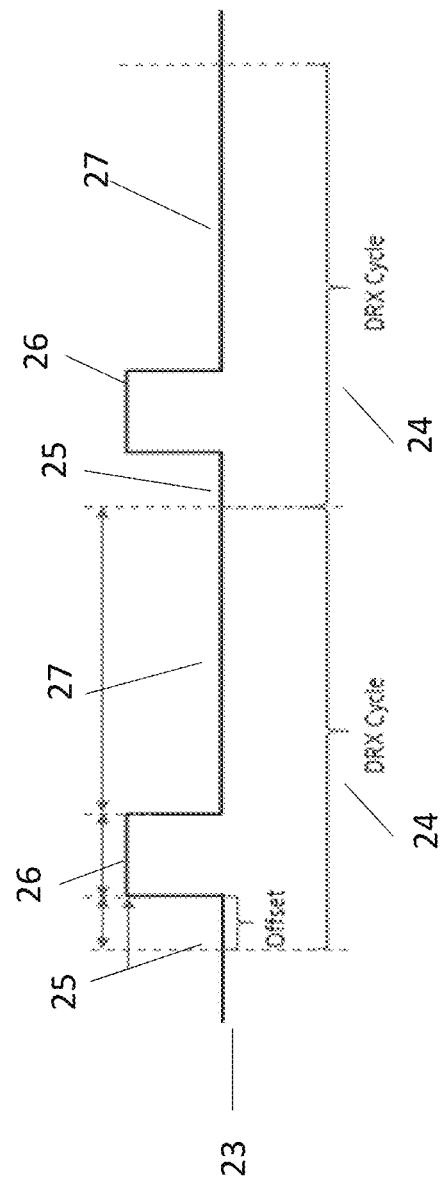
FIG. 3 represents an exemplary timing diagram of an on/off DRX timer

DRX Timers. Referring to FIG. 3, there is shown a timing diagram 23 of an exemplary DRX cycle 24. Within each DRX cycle 24, there is a DRX on duration timer 26 and a DRX inactivity timer 27. There may be an offset 25 which has the effect of a delay prior to the DRX on timer being activated within the DRX cycle 24.

Within the timing diagram, certain parameters are adjustable. Using the terminology of the standard document 5G; NR; Radio Resource Control (RRC); Protocol Specification (3GPP TS338.331), the IE DRX-Config is used to configure DRX related parameters, a sample of which is included in Exhibit A attached hereto and incorporated by reference in its entirety.

The adjustable timers include: the drx-onDurationTimer shown as DRX on duration timer 26, drx-InactivityTimer shown as DRX inactivity timer 27, ra-ContentionResolutionTimer (not shown), drx-RetransmissionTimerDL (not shown), and the drx-RetransmissionTimerUL (not shown). The CDRX timers may be customized per the International Mobile Equipment Identity (IMEI) or IMEI range with a Service Profile Identifier (SPID).

As can be seen from the Exhibit A, the DRX on duration timer 26 may have values ranging from 1 milliseconds to 1200 milliseconds, while the DRX inactivity timer may have values from 0 to 2560 milliseconds.

Upon receipt of the CDRX profile to be used based on the QCI level 1, the UE 16 may adjust the DRX on duration timer 26 and the DRX inactivity timer 27 to match the selected QCI level 1. For example, for low latency applications such as VoLTE having a level of QCI1, the on-duration timer 26 may be longer during the DRX cycle 24 and may, for example, range from a low of 50 milliseconds to a high of 1600 milliseconds, while the DRX inactivity timer 27 may be shorter during the DRX cycle 24, and may for example, range from a low of zero (0) milliseconds to 100 milliseconds. Conversely, applications in which latency is not necessarily a factor, such as email and other TCP/IP applications having QCI levels of QCI8 or QCI9, the DRX on-duration timer would be adjusted lower, which may, for example range from 1 millisecond to 100 milliseconds, while the DRX inactivity timer would be adjusted higher, which may, for example range from a low of 100 milliseconds to the maximum range of 2560 milliseconds, as set forth in more detail below.

As such, a longer or shorter CDRX profile may be selected based on the QCI. In an aspect, a longer or shorter DRC timer within a static DRX profile may be selected based on the QCI.

In an aspect, in addition to the criteria for setting a CDRX profile based on the QCI, the CDRX profile or on/off timers may be adjusted based on the application running on the device. For example, a video streaming service may use a different DRX profile than a gaming application or a social media application.

Figure 4:
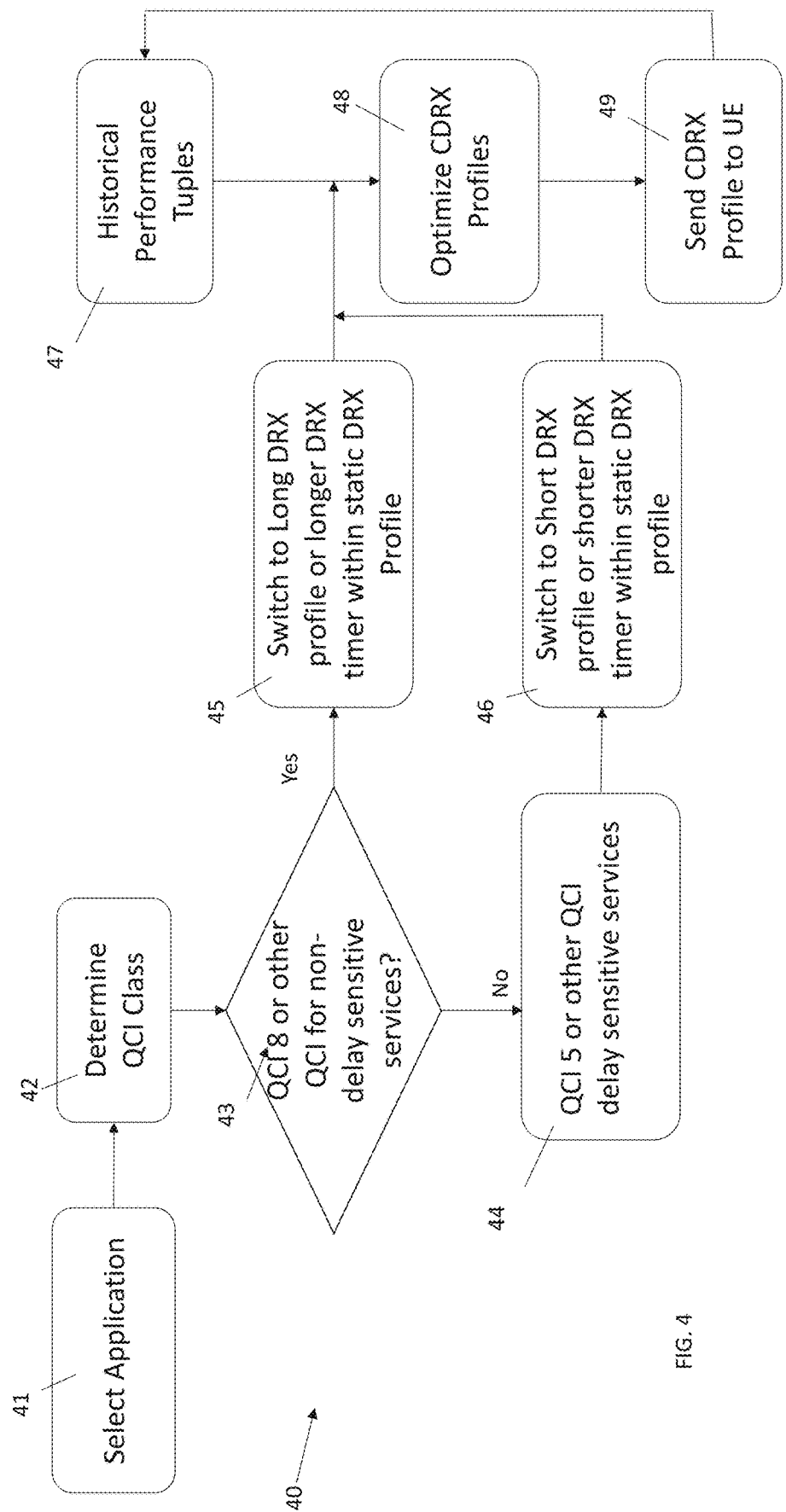
FIG. 4 represents an exemplary flow diagram of a method in accordance with the present disclosure.

Methods of Use. With reference to FIG. 4, there is shown an exemplary method 40 which may be established in accordance with the present disclosure. At 41, an application is selected by the UE 16. At 42, the QCI level is determined based on the UE 16 and the selected application. At 43, the decision is made as to whether the QCI level is QCI level 8 or another QCI for non-delay sensitive services. If yes, then a longer adjustable CDRX timer profile is set, or alternatively, a longer DRX timer within a static DRX profile is selected. At 48, the selected CDRX timer profiles are optimized using historical performance tuples 47 from the historical data base 22. At 49, the optimized CDRX profiles are then sent to the UE for use with the selected application.

If at 43, the QCI is not 8 or another QCI for non-delay sensitive devices, then at 44 it is determined that the QCI is 5 or other QCI for delay sensitive services. At 46, a shorter adjustable CDRX timer profile is set, or alternatively, a shorter DRX timer within a static DRX profile is selected. At 48, the selected CDRX timer profiles are optimized using historical performance tuples 47 from the historical data base 22. At 49 the optimized CDRX profiles are then sent to the UE for use with the selected application.

Artificial Intelligence/Machine Learning. With assistance of a machine learning agent, it is possible to update and optimize the dynamically adjusted CDRX profile/timers based on historical QCI level data. Such historical data may, for example, be stored in historical data base 22. The historical data base 22, may for example, include the historical use of applications (quantity, time of day, length of use, type of application, etc.) and the durations of such use for any particular UE 16 or group of UEs 16. An AI/ML algorithm executing in AI/ML engine 15 may use the historical data that correlates the actual QCI levels 2 with the actual CDRX timer profiles 4 used over time to predict upcoming to refine the correlation between the QCI levels 2 and the CDRX timer profiles 4. Additionally, the AI/ML engine may predict the likely upcoming use of applications and the correlation of QCI levels with actual CDRX timer profiles 4 to project anticipated battery life. For example, if the historical data base indicates that a subscriber associated with a UE 16 typically has an hour-long video conference every weekday from 4:00 to 5:00 pm, that information may be used to pre-populate the CDRX timer profiles 4 in anticipation of the video conference. Likewise, a subscriber associated with a UE 16 may typically read and respond to emails for a time period early in the morning and late in the afternoon. Such a predictive algorithm based on historical data may reduce any latency associated with dynamically adjusting the CDRX profile. At the conclusion of the video conference or the email session, the usage data may be analyzed to determine the correlation between the QCI level 2, the CDRX timer profile used, the performance of the UE 16 during the video conference, and the effect of the adjusted CDRX timer profile on battery life. This data may then be stored in tuples in the historical data base 22 and used in future analysis to further refine the correlation between QCI levels and the parameters of the CDRX timer profile and to more accurately adjust the dynamically adjustable CDRX timer profiles based on the QCI level such that optimum battery life and UE 16 performance is obtained.

Moreover, AI/ML algorithms may aggregate and use historical data across multiple users to predict dynamically adjusted CDRX profiles for individual subscribers. For example, the aggregate historical data may indicate that a certain demographic of subscribers typically subscribe to a live video or streaming event the same time every week, prompting the dynamic CDRX controller 20 to set the CDRX timer profiles 4 in advance of or at the time of the live video or streaming event and/or to optimize the adjustable CDRX timer profiles such that optimum battery life and UE performance is achieved during the live video event or streaming event.

Finally, the historical CDRX/QCI/application data may be weighted by the AI/ML algorithm such that older data is weighed less than more recent data. Alternatively, Subscriber data for locations farther from the user may be weighted less than subscriber data for locations closer to the user. Any other type of weighting of historical data may be used to optimize the balance between performance and battery life of UE 16.

In an aspect, the performance of the UE 16 may be measured in view of the selected DRX profile associated with a particular QCI and/or application. Such historical performance measurements may be stored in the historical database 22 to optimize the performance of the UE 16 over time by learning which associations of DRX profiles, QCI's and applications perform better for a particular UE 16 or set of UEs 16.

I/O System, Memory and Processor of UE. With respect to the UE 16 shown in FIGS. 1 and 2, the UE 16 may comprise hardware or a combination of hardware and software. The functionality to facilitate telecommunications via a telecommunications network may reside in one or combination of UEs 16. UE 16 depicted in FIG. 2 may represent or perform functionality of an appropriate UE 16, or combination of UEs 16, such as, for example, a component or various components of a cellular broadcast system wireless network. It is emphasized that the block diagram depicted in FIG. 2 is exemplary and not intended to imply a limitation to a specific implementation or configuration. Thus, UE 16 may be implemented in a single device or multiple devices. And may be distributed.

UE 16 may comprise a processor 7 and a memory 6 coupled to processor 7. Memory 6 may contain executable instructions that, when executed by processor 7, cause processor 7 to effectuate operations associated with the present disclosure. As evident from the description herein, UE 16 is not to be construed as software per se.

In addition to processor 7 and memory 6, UE 16 may include an input/output system 5. Processor 7, memory 6, and input/output system 5 may be coupled together (coupling not shown in FIG. 2) to allow communications between them. Each portion of UE 16 may comprise circuitry for performing functions associated with each respective portion. Thus, each portion may comprise hardware, or a combination of hardware and software. Accordingly, each portion of UE 16 is not to be construed as software per se. Input/output system 5 may be capable of receiving or providing information from or to a communications device or other network entities configured for telecommunications. For example, input/output system 5 may include a wireless communication (e.g., 4G/5G/GPS) card. Input/output system 5 may be capable of receiving or sending video information, audio information, control information, image information, data, or any combination thereof. Input/output system 5 may be capable of transferring information with UE 16. In various configurations, input/output system 5 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 5 may comprise a Wi-Fi finder, a two-way GPS chipset or equivalent, or the like, or a combination thereof.

Input/output system 5 of UE 16 also may contain a communication connection shown in FIG. 1 that allows UE 16 to communicate with other devices, network entities, or the like. Communication connection may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 5 also may include an input device (not shown) on the UE 16 such as keyboard, mouse, pen, voice input device, or touch input device. Input/output system 5 may also include an output device (not shown) on the UE 16, such as a display, speakers, or a printer.

Processor 7 may be capable of performing functions associated with telecommunications, such as functions for adjusting CDRX timers, as described herein.

Memory 6 of UE 16 may comprise a storage medium having a concrete, tangible, physical structure. As is known, a signal does not have a concrete, tangible, physical structure. Memory 6, as well as any computer-readable storage medium described herein, is not to be construed as a signal. Memory 6, as well as any computer-readable storage medium described herein, is not to be construed as a transient signal. Memory 6, as well as any computer-readable storage medium described herein, is not to be construed as a propagating signal. Memory 6, as well as any computer-readable storage medium described herein, is to be construed as an article of manufacture.

Memory 6 may store any information utilized in conjunction with telecommunications. Depending upon the exact configuration or type of processor, memory 6 may include a volatile storage (such as some types of RAM), a nonvolatile storage (such as ROM, flash memory), or a combination thereof. Memory 6 may include additional storage (e.g., a removable storage or a non-removable storage) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by UE 16. Memory 6 may comprise executable instructions that, when executed by processor 7, cause processor 7 to effectuate operations to execute the methods described herein.

In view of the foregoing, this disclosure provides a practical application that builds a centralized system to provide for the automatic augment of physical infrastructure. The practical application includes the automatic determination for network augment, including the monitoring of KPIs associated with networks, triggering a physical augment, and then autonomously providing that physical augment to the network. As such, the disclosure provides a new and novel method for offering and pricing of a new service offering that advances the state of the telecommunications industry.

While examples of a telecommunications system have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used, or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope of the disclosed subject matter is defined by the claims and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. A method comprising:
   predicting that each subscriber device of a set of subscriber devices will run a live video or streaming application at a predetermined upcoming time period for a live video or streaming event;
   in response to the predicting that each subscriber device of the set of subscriber devices will run the live video or streaming application at the predetermined upcoming time period, determining a quality of service class identifier (QCI) level for the live video or streaming application based on a type of application or a type of traffic associated with the live video or streaming application;
   selecting a connected mode discontinuous reception (CDRX) profile based on the determining the QCI level, wherein the CDRX profile has an on period for a discontinuous reception (DRX) cycle and an inactive period for the DRX cycle; and
   in advance of the live video or streaming event, transmitting the CDRX profile to the set of subscriber devices to set CDRX timers at the set of subscriber devices for use during the live video or streaming event, thereby facilitating optimization of battery life and subscriber device performance during the live video or streaming event.

2. The method of claim 1 wherein the QCI level is indicative of delay sensitivity of the live video or streaming application and wherein the CDRX profile is selected based on the delay sensitivity of the live video or streaming application.

3. The method of claim 1 wherein the CDRX profile has an off-cycle time that is adjustable to be longer for non-delay sensitive applications than for delay sensitive applications.

4. The method of claim 1 further comprising aggregating and using historical data associated with multiple subscriber devices to predict one or more adjusted CDRX profiles for individual subscriber devices, wherein the selecting the CDRX profile is in accordance with the aggregating and the using of the historical data, and wherein the historical data is weighted such that older data in the historical data is weighed less than newer data in the historical data.

5. The method of claim 1 wherein the inactive period of the CDRX profile is adjustable to be longer for applications that are not delay sensitive than for applications that are delay sensitive.

6. The method of claim 1 wherein the live video or streaming event is held on a periodic basis.

7. The method of claim 1 wherein the CDRX profile is selected based on a historical association between QCI levels and CDRX profiles.

8. The method of claim 1 wherein the method is implemented in a dynamic CDRX controller deployed in a network.

9. The method of claim 1 wherein a performance of one or more subscriber devices of the set of subscriber devices is measured in view of the CDRX profile and the QCI level and wherein the CDRX profile is selected based on historical performance data.

10. The method of claim 1 wherein the CDRX profile is static and a DRX timer is adjusted based on the QCI level.

11. An apparatus comprising:
an input-output interface; and
a processor coupled to the input-output interface wherein the processor is further coupled to a memory, the memory having stored thereon executable instructions that when executed by the processor cause the processor to effectuate operations comprising:
predicting that each subscriber device of a set of subscriber devices will run a live video or streaming application at a predetermined upcoming time period for a live video or streaming event;
in response to the predicting that each subscriber device of the set of subscriber devices will run the live video or streaming application at the predetermined upcoming time period, identifying a quality of service class identifier (QCI) level for the live video or streaming application based on a type of application or a type of traffic associated with the live video or streaming application;
selecting a continuous mode discontinuous reception (CDRX) profile based on the identifying the QCI level, wherein the CDRX profile has an on period for a discontinuous reception (DRX) cycle and an inactive period for the DRX cycle; and
prior to the live video or streaming event, transmitting the CDRX profile to the set of subscriber devices to set CDRX timers at the set of subscriber devices for use during the live video or streaming event, thereby facilitating optimization of battery life and subscriber device performance during the live video or streaming event.

12. The apparatus of claim 11 wherein the operations further comprise aggregating and using historical data associated with multiple subscriber devices to predict one or more adjusted CDRX profiles for individual subscriber devices, wherein the selecting the CDRX profile is in accordance with the aggregating and the using of the historical data, and wherein the historical data is weighted such that older data in the historical data is weighed less than newer data in the historical data.

13. The apparatus of claim 11 wherein the operations further comprise measuring a performance of one or more subscriber devices of the set of subscriber devices and optimizing the performance based on an historical association of the CDRX profile and the QCI level.

14. The apparatus of claim 11 wherein the QCI level is indicative of delay sensitivity of the live video or streaming application and wherein the CDRX profile is selected based on the delay sensitivity of the live video or streaming application.

15. The apparatus of claim 11 wherein the CDRX profile has an off cycle that is adjustable to be longer for non-delay sensitive applications than for delay sensitive applications.

16. The apparatus of claim 11 wherein the live video or streaming event is held on a periodic basis.

17. The apparatus of claim 11, wherein the inactive period of the CDRX profile is adjustable to be longer for applications that are not delay sensitive than for applications that are delay sensitive.

18. A system comprising:
a server associated with a set of subscriber devices and configured to perform operations, comprising:
predicting that each subscriber device of the set of subscriber devices will run a video or streaming application at a predetermined upcoming time period for a video or streaming event;
in response to the predicting that each subscriber device of the set of subscriber devices will run the video or streaming application at the predetermined upcoming time period determining a quality of service class identifier (QCI) level for the video or streaming application based on a type of application or a type of traffic associated with the video or streaming application;
selecting a connected mode discontinuous reception (CDRX) profile based on the determining the QCI level, wherein the CDRX profile has an on period for a discontinuous reception (DRX) cycle and an inactive period for the DRX cycle; and
in advance of the video or streaming event, transmitting the CDRX profile to the set of subscriber devices to set CDRX timers at the set of subscriber devices for use during the video or streaming event, thereby facilitating optimization of battery life and subscriber device performance during the video or streaming event.

19. The system of claim 18 wherein the server has a machine learning engine in communication with an historical database and wherein the CDRX profile is generated based on a machine learning algorithm.

20. The system of claim 18 wherein the operations further comprise aggregating and using historical data associated with multiple subscriber devices to predict one or more adjusted CDRX profiles for individual subscriber devices, wherein the selecting the CDRX profile is in accordance with the aggregating and the using of the historical data, and wherein the historical data is weighted such that older data in the historical data is weighed less than newer data in the historical data.

* * * * *